Jan. 23, 1962     P. S. LITT     3,018,234
PROCESS FOR TREATING A MANGANESE CONTAINING
ORE FOR THE RECOVERY OF MANGANESE
VALUES THEREFROM
Filed Feb. 9, 1959

INVENTOR.
PETER S. LITT
BY
ATTORNEYS

United States Patent Office 3,018,234
Patented Jan. 23, 1962

3,018,234
PROCESS FOR TREATING A MANGANESE CONTAINING ORE FOR THE RECOVERY OF MANGANESE VALUES THEREFROM
Peter S. Litt, 10 S. Ogden St., Denver, Colo.
Filed Feb. 9, 1959, Ser. No. 792,095
4 Claims. (Cl. 204—83)

This invention is directed to a process for the separation of manganese values from an ore or gangue containing manganese and more particularly to a process wherein electrical current is utilized in the separation.

An important object of this invention is to provide an improved method of separating manganese values from their ores.

Another object of this invention is to provide an improved process which is both economical and efficient.

According to the invention, a manganese ore is ground to about 20 mesh and slurried in a saline solution containing a small amount of yeast. A D.C. current is passed through the slurried ore and the manganese values are rendered separable mechanically from the rock. This process is illustrated diagrammatically by FIGURE 2.

Figure 1:
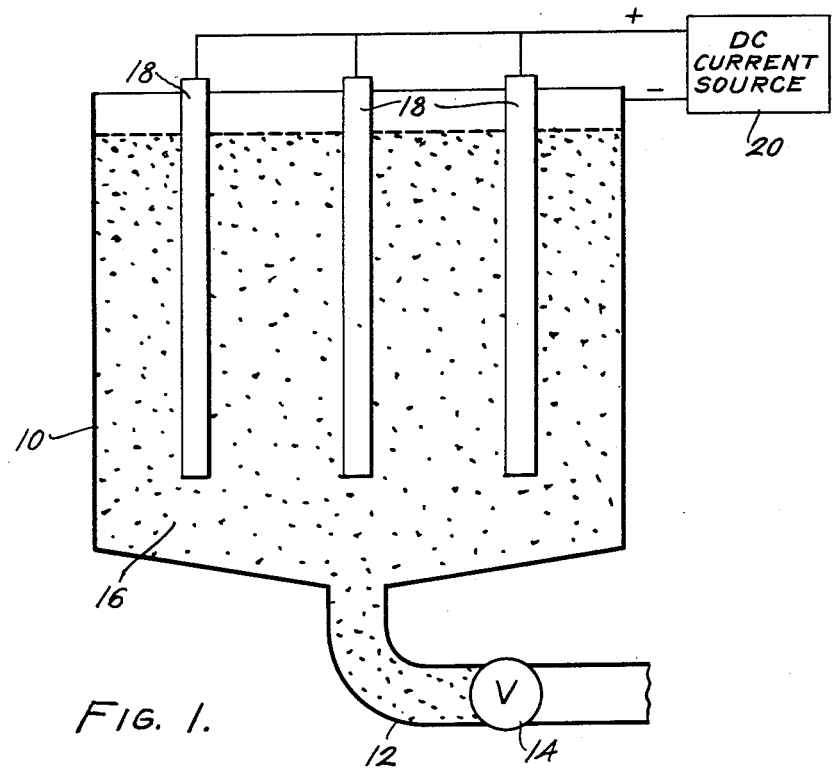
FIGURE 1 is one form of apparatus, partly in section, suitable for carrying out the process of this invention.

The process of this invention may conveniently be carried out in the apparatus of FIGURE 1, wherein numeral 10 designates a vertical tank of iron or mild steel open at the top. Tank 10 is provided with a draw-off pipe 12 which may be connected to the apex of a conical shaped bottom or be connected through the side of the tank near the bottom. Pipe 12 is provided with a valve 14 to facilitate draining the tank. The manganese ore, ground to about 20 mesh, is introduced into tank 10. A saline solution containing yeast is added to the tank to form a slurry 16. Enough liquid is added to at least cover the ore. One or more electrodes 18, of carbon and the like, are immersed in the ore slurry out of contact with tank 10. A source of D.C. current 20 is connected between the electrodes 18 and tank 10 with the electrodes being connected positive. Current is applied for a period of time accompanied by evolution of gas from the body of the slurry. After from about 20 minutes to 1½ hours time, depending on the electrode surface area and the amount of current supplied, the reaction is complete and the source of current is disconnected. The slurry is drained from tank 10 through pipe 12 and valve 14 and the manganese values are separated from the other constituents as by passing the slurry over a Wilfley table or a mineral jig.

Figure 2:
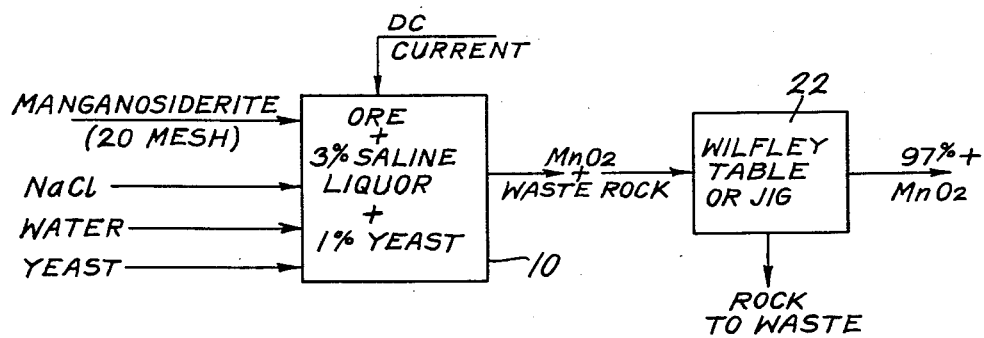
FIGURE 2 is a flow diagram of the process according to this invention.

A specific example of the process of the instant invention is illustrated by the flow diagram of FIGURE 2. The manganese ore treated is a manganosiderite containing 21.6% Mn. The ore was reduced by grinding to about 20 mesh and 950 pounds of the ground ore placed in tank 10. Water in an amount sufficient to cover the ore was introduced into the tank. An amount of sodium chloride was added to the ore slurry to produce a saline liquor of about 3% concentration and dry yeast was added in the amount of about 1% of the reaction mass. A source of D.C. current was connected between a single two inch diameter carbon electrode and tank 10, with the electrode being connected to the positive terminal. A current of 50 amperes at 90 volts was passed through the slurry and in about two minutes a gas began to evolve from the slurry in the vicinity of the electrode. After about 10 minutes bubbles of gas were in evidence over the entire surface of the slurry. The temperature of the reaction mass was about 120° F. After about 1½ hours, the reaction was complete and the current shut off. The slurry was flushed from tank 10 and passed over a Wilfley table 22 to separate the manganese values. This separation can also be accomplished by treating the slurry with a mineral jig.

The manganese values separate as manganese dioxide having a purity of 99.72% and containing 63.01% manganese. Some 200 pounds of manganese dioxide of the above purity were recovered from the 950 pounds of ore treated indicating a recovery of 97% or better.

By increasing the number of electrodes and the current density, the reaction time may be decreased. For example, using six two inch carbon electrodes, the reaction is completed on a half-tone batch in about twenty minutes.

The gas evolved from the slurry during the application of current thereto mainly comprises $CO_2$ with minor amounts of chlorine. It is believed that the passage of current through the reaction mass dissociated a portion of the sodium chloride and the chloride ions combine with free hydrogen ions to produce hydrogen chloride which in aqueous solution reacts with the carbonate of the ore to liberate the manganese values as manganese dioxide. While the function of the yeast in the reaction is not known, the presence of an amount of yeast is necessary for the successful operation of the instant process.

While the present invention is illustrated as being applicable to a manganosiderite ore, it is to be understood that the invention is equally applicable to other manganese containing ores. It is to be further understood that the theory of operation ascribed to the process of this invention is for purposes of explanation only and is not to be construed as binding.

The principles of the invention described above in conjunction with the specific example thereof, will suggest various modifications to one skilled in the art. While there has been described what at present is considered to be the preferred embodiment of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A process of treating a manganese containing siderite ore to recover the manganese values therefrom comprising the steps of: finely grinding the ore, slurrying the finely ground ore with a dilute saline solution, adding an amount of yeast to the slurry, passing a direct current through the slurry for a period of time sufficient to liberate the manganese values as manganese dioxide and recovering the liberated values.

2. A process according to claim 1, wherein the current is passed through the slurry between at least one electrode immersed in the slurry and a container for the slurry.

3. A process in accordance with claim 2 wherein the electrode is made positive with respect to the container.

4. A process of treating a mangano siderite ore to recover the manganese values therefrom as manganese dioxide comprising the steps of grinding the ore to at least about 20 mesh, introducing the ground ore into a container and slurrying with water, adding an amount of sodium chloride sufficient to produce a saline solution of about 3% concentration, adding an amount of yeast equal to about 1% of the slurried mass, immersing at least one electrode in the slurried mass out of electrical contact with the container, passing a direct current through the slurried mass between said electrode and said container with the electrode being positive with respect to the container, continuing the passage of current for a period of time sufficient to liberate the manganese as manganese dioxide and mechanically separating the manganese dioxide from the gangue to recover same.

References Cited in the file of this patent

UNITED STATES PATENTS 1,878,244   Laury _____ Sept. 20, 1932

OTHER REFERENCES

Bureau of Mines Report of Investigation 4817, "Semi-Pilot-Plant Investigations on Electrowinning Manganese From Chloride Electrolytes," by Jacobs et al., September 1951, pp. 1–13.